(12) United States Patent
Yamaguchi et al.

(10) Patent No.: US 12,463,566 B2
(45) Date of Patent: Nov. 4, 2025

(54) ELECTRIC MACHINE SYSTEM

(71) Applicant: IHI Corporation, Tokyo (JP)

(72) Inventors: Koji Yamaguchi, Tokyo (JP); Shota Fujisawa, Tokyo (JP); Toru Kuribayashi, Tokyo (JP); Kenshiro Katsura, Tokyo (JP); Tatsuro Yamada, Tokyo (JP); Yoshiaki Takahashi, Tokyo (JP)

(*) Notice: Subject to any disclaimer, the term of this patent is extended or adjusted under 35 U.S.C. 154(b) by 185 days.

(21) Appl. No.: 18/414,299

(22) Filed: Jan. 16, 2024

(65) Prior Publication Data
US 2024/0154547 A1 May 9, 2024

Related U.S. Application Data

(63) Continuation of application No. PCT/JP2022/036569, filed on Sep. 29, 2022.

(30) Foreign Application Priority Data

Oct. 1, 2021 (JP) .................. 2021-162730

(51) Int. Cl.
*H02P 27/08* (2006.01)
*H02P 6/15* (2016.01)
*H02P 6/30* (2016.01)

(52) U.S. Cl.
CPC .............. *H02P 6/153* (2016.02); *H02P 6/30* (2016.02)

(58) Field of Classification Search
CPC .... H02P 6/153; H02P 6/30; H02P 6/10; H02P 9/48; H02P 27/06; H02P 6/15
See application file for complete search history.

(56) References Cited

U.S. PATENT DOCUMENTS 8,242,735 B2 * 8/2012 Hein ................. H02P 29/68
318/807
9,246,428 B2 * 1/2016 Yokozutsumi ...... H02P 21/0089
(Continued)

FOREIGN PATENT DOCUMENTS

JP 2008-099485 4/2008
JP 2008-104315 5/2008
(Continued)

OTHER PUBLICATIONS

International Search Report dated Nov. 15, 2022 for PCT/JP2022/036569.
(Continued)

*Primary Examiner* — Muhammad S Islam
(74) *Attorney, Agent, or Firm* — SOEI PATENT & LAW FIRM

(57) ABSTRACT

An electric machine system includes an electric machine, an electric power converter, and a control unit. The electric machine includes a stator that includes coils, and a rotator that includes a magnet and is rotatable with respect to the stator. The electric power converter inputs electric power with respect to the coils of the electric machine. The control unit controls the electric power converter. The control unit includes an output unit and a correction unit. The output unit outputs a control signal for operating the electric power converter to the electric power converter. The correction unit corrects a phase of the control signal that determines input timing of the electric power with respect to the coils of the electric machine. The correction unit corrects the phase so that the magnitude of the electric power approaches an extreme value.

20 Claims, 12 Drawing Sheets

(56) References Cited

U.S. PATENT DOCUMENTS

2012/0235609 A1    9/2012  Ide et al.
2015/0123592 A1    5/2015  Oga et al.
2017/0272016 A1*   9/2017  Fukumaru ............... H02P 27/08

FOREIGN PATENT DOCUMENTS

JP    2008-115751    5/2008
JP    2015-089318    5/2015
WO    2011/077829    6/2011

OTHER PUBLICATIONS

Extended Search Report in corresponding European Application No. 22876498.1, dated Apr. 22, 2025.
International Preliminary Report on Patentability with Written Opinion dated Apr. 11, 2024 for PCT/JP2022/036569.

* cited by examiner

ELECTRIC MACHINE SYSTEM

CROSS-REFERENCE TO RELATED APPLICATION

This application is a continuation application of PCT Application No. PCT/JP2022/036569, filed Sep. 29, 2022, which claims the benefit of priority from Japanese Patent Application No. 2021-162730 filed on Oct. 1, 2021. The entire contents of the above listed PCT and priority applications are incorporated herein by reference.

BACKGROUND

The present disclosure relates to an electric machine system.

In the related art, an electric machine including a stator and a rotator is known (for example, refer to International Publication WO 2011/077829). In the electric machine described in International Publication WO 2011/077829, a position of the rotator is detected by determining the polarity of a rotator magnetic pole by using hysteresis properties of a motor.

By the way, in the electric machine as described above, for example, in order to improve performance such as efficiency, electric power is input in conformity with timing at which the rotator is located at a predetermined position. However, it is difficult to detect the position of the rotator with high precision, or to control input timing of the electric power with high precision. When the timing at which the rotator is located at the predetermined position and the input timing of the electric powder deviate from each other, there is a concern that wasteful power consumption occurs and as a result, the performance of the electric machine may deteriorate.

The present disclosure is about an electric machine system which may improve performance.

SUMMARY

An electric machine system according to an aspect of the present disclosure includes: an electric machine including a stator that includes coils, and a rotator that includes a magnet and is rotatable with respect to the stator; an electric power converter that inputs and outputs electric power with respect to the coils; and a control unit that controls the electric power converter, in which the control unit includes an output unit that outputs a signal for operating the electric power converter to the electric power converter, and a correction unit that corrects a phase of the signal that determines input and output timing of the electric power with respect to the coils, and the correction unit corrects the phase so that the magnitude of the electric power approaches an extreme value.

In the electric machine system, the correction unit corrects the phase of the signal so that the magnitude of the electric power that is input and output with respect to the coils approaches an extreme value. In a case where magnitude of the electric power becomes the extreme value, it is assumed that the loss of the electric machine is minimum, that is, the phase of the signal with respect to the position of the rotator is optimal. According to this, even when the position of the rotator is not detected with high precision, wasteful power consumption may be suppressed by optimizing the phase of the signal. Accordingly, according to the electric machine system, the performance may be improved.

The electric machine may be an electric motor, the extreme value may be a minimum value, and in a case where the electric power decreases as a result of correction of the phase in a first direction, the correction unit may correct the phase in the first direction again, and in a case where the electric power increases as a result of correction of the phase in the first direction, the correction unit may correct the phase in a second direction opposite to the first direction. According to this configuration, in a case where the electric machine is the electric motor, the correction direction of the phase may be changed on the basis of the variation of the electric power due to correction of the phase. According to this, the magnitude of the electric power may approach the minimum value.

In a case where the phase becomes larger than a maximum limit value as a result of correction of the phase, the correction unit may set the maximum limit value as the phase after correction, and in a case where the phase becomes smaller than a minimum limit value as a result of correction of the phase, the correction unit may set the minimum limit value as the phase after correction. According to this configuration, the phase of the signal may be suppressed from deviating to an unintended range.

The correction unit may include an execution mode in which correction of the phase is executed, and a pause mode in which correction of the phase is paused. According to this configuration, a mode may be switched to the execution mode only in a case where it is necessary to correct the phase of the signal with respect to the position of the rotator.

The electric machine may be a generator, the extreme value may be a maximum value, and in a case where the electric power increases as a result of correction of the phase in the first direction, the correction unit may correct the phase in the first direction again, and in a case where the electric power decreases as a result of correction of the phase in the first direction, the correction unit may correct the phase in a second direction opposite to the first direction. According to this configuration, in a case where the electric machine is the generator, the correction direction of the phase may be changed on the basis of a variation of the electric power due to correction of the phase. According to this, the magnitude of the electric power may approach the maximum value.

An electric machine system according to another aspect of the present disclosure includes: an electric machine including a stator that includes coils, and a rotator that includes a magnet and is rotatable with respect to the stator; an electric power converter that inputs and outputs electric power with respect to the coils; and a control unit that controls the electric power converter. The control unit includes an output unit that outputs a signal for operating the electric power converter to the electric power converter, and a correction unit that corrects a phase of the signal that determines input and output timing of the electric power with respect to the coils, and the correction unit corrects the phase so that an index value correlated to a current that is input and output with respect to the coils approaches an extreme value.

In the electric machine system, the correction unit corrects the phase of the signal so that an index value correlated to a current that is input and output with respect to the coils approaches an extreme value. In a case where an index value correlated to a current that is input and output with respect to the coils becomes an extreme value, it is assumed that the loss of the electric machine is minimum, that is, the phase of the signal with respect to the position of the rotator is optimal. According to this, even when the position of the rotator is not detected with high precision, wasteful power consumption may be suppressed by optimizing the phase of the signal. Accordingly, according to the electric machine system, the performance may be improved.

The index value may be a division value obtained by dividing the current by torque of the electric machine. According to this, since a variation amount of the index value per a variation amount of the phase becomes relatively large, control of the phase may be performed with higher sensitivity.

The index value may be the current. According to this, the performance of the electric machine system may be improved by using the current as the index value.

The index value may be a multiplication value obtained by multiplying an AC current that is input and output with respect to the coils by an AC voltage that is input and output with respect to the coils. According to this, the performance of the electric machine system may be improved by using the multiplication value of the AC current and the AC voltage as the index value.

According to the present disclosure, an electric machine system which may improve performance may be provided.

DETAILED DESCRIPTION

Figure 1:
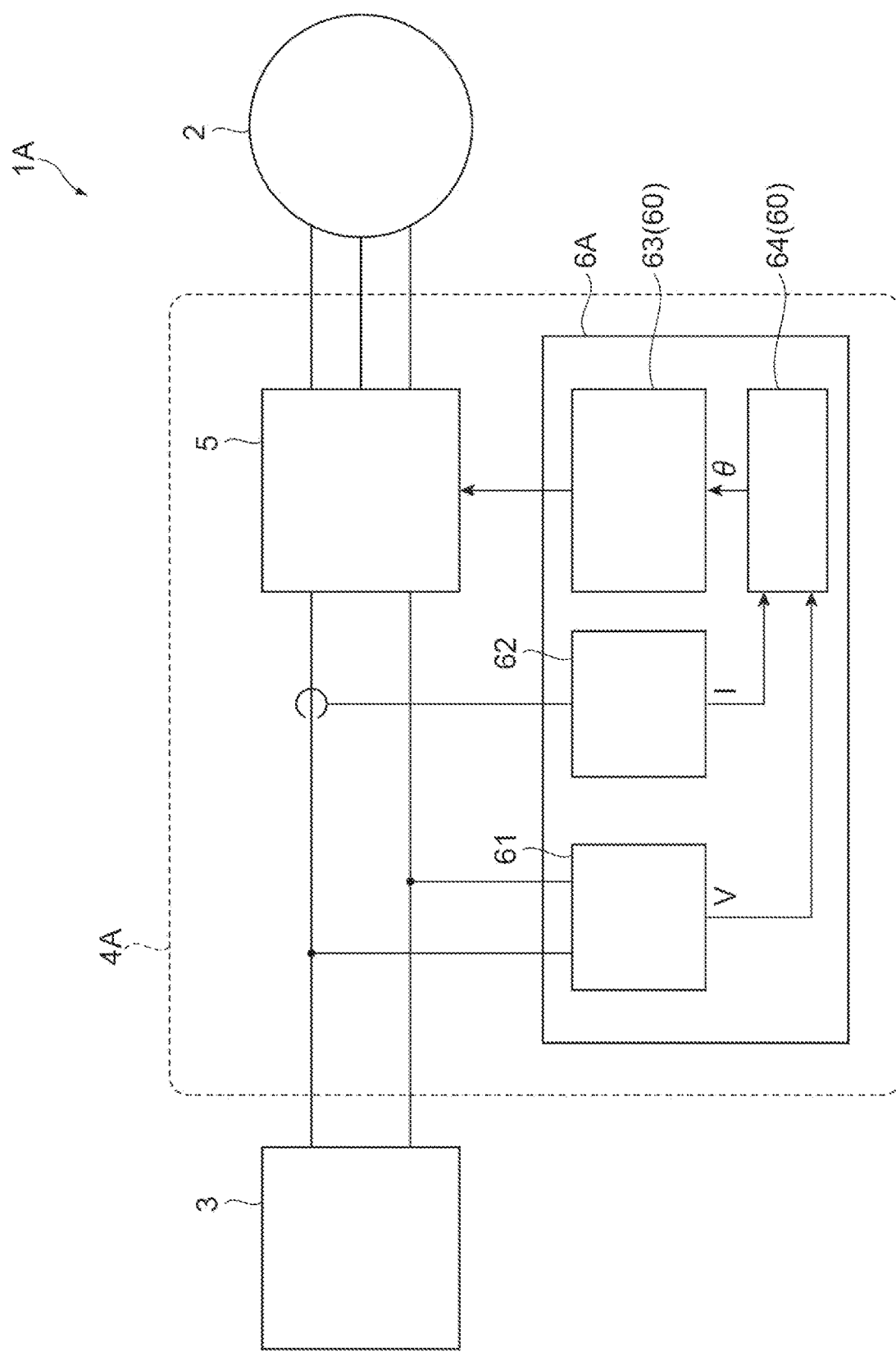
FIG. 1 is a configuration diagram of an electric machine system according to an example.

Hereinafter, examples of the present disclosure will be described in detail with reference to the drawings. Note that, in each of the drawings, the same reference numerals will be given to the same or equivalent portions, and redundant description will be omitted.

As illustrated in FIG. 1, an electric machine system 1A includes an electric machine 2, a power supply 3, and a drive device 4A. The electric machine system 1A is applied to, for example, an electric compressor, an electric blower, a vehicle (moving body), or the like. The electric machine 2 is an electric motor (motor). The electric machine 2 includes a stator (motor stator), and a rotator (motor rotator) that is rotatable with respect to the stator. The rotator includes a shaft, and a permanent magnet provided in the shaft. The stator surrounds the rotator in a circumferential direction. The stator includes a plurality of coils and an iron core.

When electric power is supplied to the coils of the stator, the stator generates a magnetic field. The magnetic field causes a force in a circumferential direction to the rotator, and as a result, torque is applied to the rotator. The rotator is rotated due to an operation of the torque. The electric machine 2 has characteristics corresponding to high-speed rotation (for example, 100,000 to 200,000 rpm) of the rotator. The power supply 3 is a DC power supply. For example, the power supply 3 is a storage battery.

The drive device 4A includes an electric power converter 5 and a control device 6A. The electric power converter 5 is connected to the electric machine 2 and the power supply 3. The electric power converter inputs electric power output from the power supply 3 to the coils of the electric machine 2. That is, the electric power output from the power supply 3 is input to the electric machine 2 through the electric power converter 5. The electric power converter 5 functions as an inverter. The electric power converter 5 converts DC electric power output from the power supply 3 into AC electric power. The electric power converter 5 inputs the AC electric power to the electric machine 2. The electric power converter 5 includes, for example, a switch circuit. The switch circuit includes, for example, a semiconductor switch such as MOSFET and IGBT. The electric power converter 5 supplies the AC electric power to the electric machine 2, for example, by a PWM control method.

The control device 6A includes a voltage detection unit 61, a current detection unit 62, and a control unit 60. The voltage detection unit 61 is connected between the electric power converter 5 and the power supply 3. The voltage detection unit 61 detects a DC voltage V output from the power supply 3. The voltage detection unit 61 transmits a signal relating to a detected voltage V to a correction unit 64 to be described later.

The current detection unit 62 is connected between the electric power converter 5 and the power supply 3. The current detection unit 62 detects a DC current I output from the power supply 3. The current detection unit 62 transmits a signal relating to a detected current I to the correction unit 64.

The control unit 60 controls the electric power converter 5. For example, the control unit 60 is a computer device including such as a processor (for example, CPU or the like), and a memory (for example, ROM, RAM, or the like). The control unit 60 includes an output unit 63 and the correction unit 64 as a functional configuration. The output unit 63 outputs a signal (hereinafter, referred to as "control signal") for operating the electric power converter 5 to the electric power converter 5.

Figure 2:
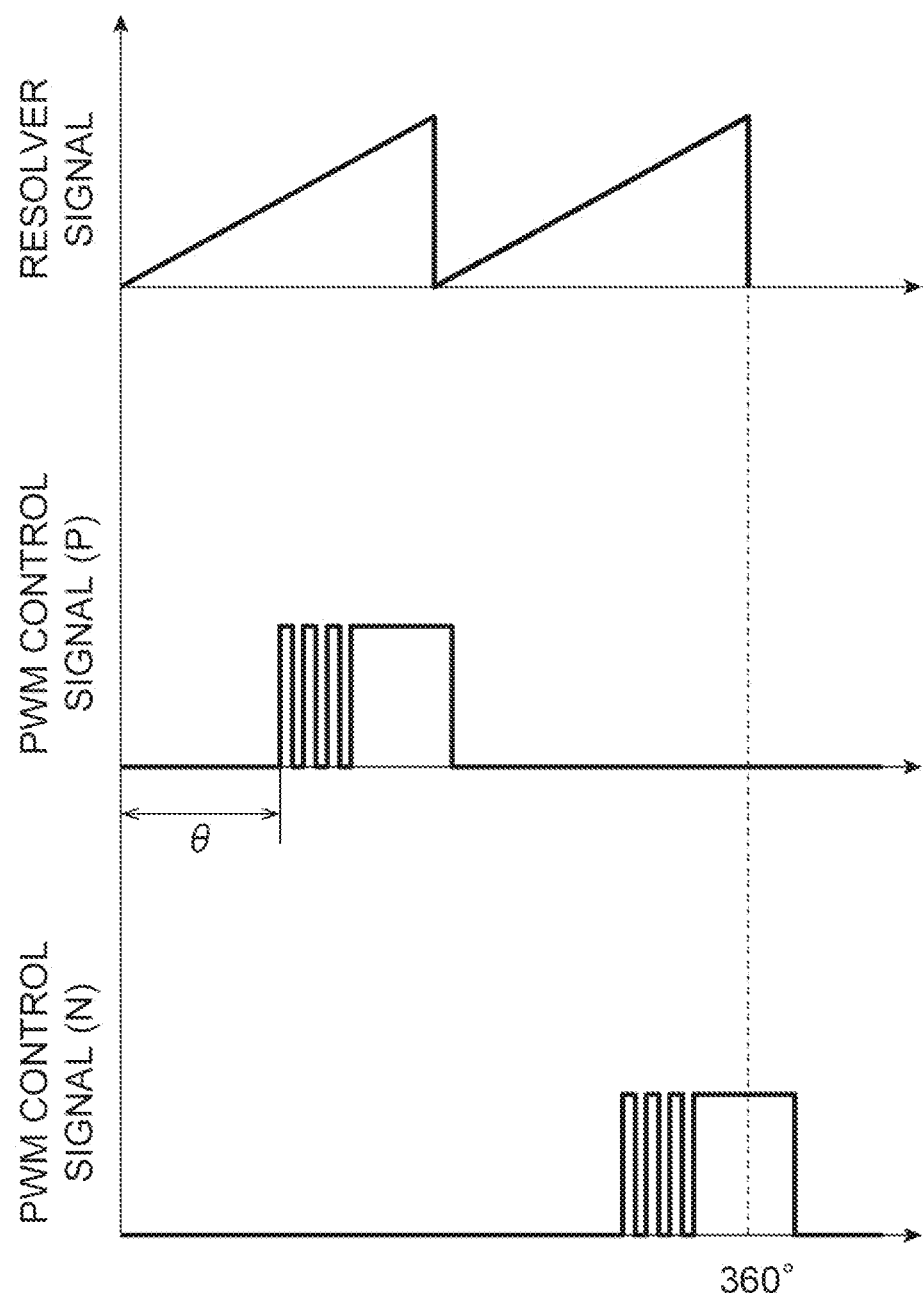
FIG. 2 is a graph showing a phase of a signal with respect to a position of a rotator.

As illustrated in FIG. 2, the control signal is, for example, a PWM control signal. The output unit 63 generates a signal (P) and a signal (N) relating to each of a plurality of semiconductor switches of the electric power converter 5. As an example, each of the signal (P) and the signal (N) has an energization period of 120°, ON/OFF is repeated in a period of the first half of 60°, and a period of the second half of 60° is set to ON. The output unit 63 outputs the control signal to the electric power converter 5. The electric power converter 5 inputs the AC electric power to the coils of the electric machine 2 while converting the DC electric power into the AC electric power in response to the control signal. Note that, electric power input timing with respect to the coils of the electric machine 2 matches timing at which the control signal is output to the electric power converter 5.

The correction unit 64 corrects a phase of the control signal with respect to a position of the rotator. The position of the rotator represents a rotation angle of the rotator with respect to the stator. As an example, when the rotator rotates by 90° from a reference position (0°) of the rotator with respect to the stator, the position of the rotator is 90°. The position of the rotator is detected, for example, by a resolver. For example, two cycles of resolver signals are output while the rotator rotates by one rotation (360° rotation) with respect to the stator.

The phase of the control signal with respect to the position of the rotator (hereinafter, simply referred to as "phase") represents timing at which the control signal is output to the electric power converter 5 with respect to the position of the rotator. As an example, in a case where the control signal is output to the electric power converter 5 at timing at which the position of the rotator is 90°, a phase $\theta$ is 90°. That is, the phase $\theta$ determines electric power input timing with respect to the coils of the electric machine 2.

In other words, in a case where the position of the rotator is 90° and rising timing of the control signal for one cycle (for example, initiation timing of the period of the first half of 60° of the signal (P)) match each other, the phase $\theta$ is 90°.

The correction unit 64 outputs a signal relating to the phase $\theta$ after correction to the output unit 63. The output unit 63 outputs the control signal to the electric power converter 5 at timing at which the rotator is located at a position corresponding to the phase $\theta$ after correction. As an example, in a case where the phase $\theta$ is 90°, the output unit 63 outputs the control signal to the electric power converter 5 at timing at which the position of the rotator is 90°. The electric power converter 5 inputs the electric power output from the power supply 3 to the electric machine 2 in response to the control signal. As an example, the electric power converter initiates input of electric power to the electric machine 2 at timing at which the position of the rotator is 90°. In other words, in a case where the phase $\theta$ is 90°, the electric power converter 5 inputs the electric power to the electric machine 2 so that the timing at which the position of the rotator is 90° and the rising timing of the control signal for one cycle match each other. According to this, rotational torque is generated in the rotator at the timing at which the position of the rotator is 90°.

Hereinafter, correction of the phase $\theta$ by the correction unit 64 will be described in detail. The correction unit 64 calculates electric power to be input to the electric machine 2 (hereinafter, simply referred to as "electric power") on the basis of a signal relating to the voltage V which is transmitted from the voltage detection unit 61 and a signal relating to the current I which is transmitted from the current detection unit 62.

Figure 3:
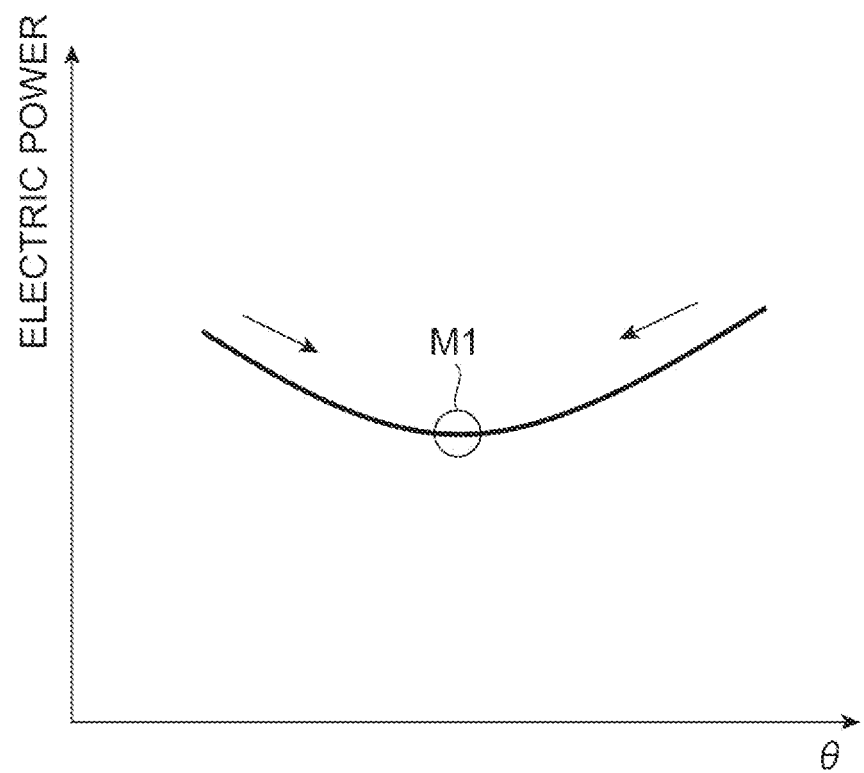
FIG. 3 is a graph showing a relationship between the phase of the signal with respect to the position of the rotator, and electric power of the electric machine.

The correction unit 64 corrects the phase $\theta$ so that the magnitude of the electric power approaches an extreme value. The extreme value represents a maximum value or a minimum value. In this example, the extreme value is a minimum value. As illustrated in FIG. 3, the magnitude of the electric power tends to decrease in accordance with an increase in the phase $\theta$, and tends to increase after reaching a minimum value M1. When the phase $\theta$ approaches an optimal value, a power factor of the electric machine 2 is improved and a loss is decreased, and as a result, the magnitude of the electric power approaches the minimum value M1. In other words, in a case where the magnitude of the electric power becomes the minimum value M1, it is assumed that the phase $\theta$ becomes the optimal value.

The correction unit 64 corrects the phase $\theta$ on the basis of a variation of the electric power. The correction unit 64 increases or decreases the phase $\theta$ for every predetermined correction width (correction amount). That is, the phase $\theta$ increases or decreases by a correction width for every correction by the correction unit 64. In this example, the correction unit 64 increases or decreases a phase correction amount (correction width) with respect to a reference phase for control. In other words, the correction unit 64 corrects a reference phase for control in order for the electric power to be an extreme value. In this example, a direction in which the phase $\theta$ is increased is referred to as a first direction, and a direction in which the phase $\theta$ is decreased is referred to as a second direction. In this example, switching from the first direction to the second direction and switching from the second direction to the first direction are referred to as reversal of the correction direction.

The correction unit 64 maintains the correction direction in a case where the electric power decreases, and reverses the correction direction in a case where the electric power increases. Specifically, in a case where the electric power decreases as a result of correction of the phase $\theta$ in the increasing direction (first direction), the correction unit 64 corrects the phase $\theta$ in the increasing direction again. In a case where the electric power increases as a result of correction of the phase $\theta$ in the increasing direction, the correction unit 64 corrects the phase $\theta$ in a decreasing direction (a second direction opposite to the first direction).

In a case where the electric power decreases as a result of correction of the phase $\theta$ in the decreasing direction, the correction unit 64 corrects the phase $\theta$ in the decreasing direction again. In a case where the electric power increases as a result of correction of the phase $\theta$ in the decreasing direction, the correction unit 64 corrects the phase $\theta$ in the increasing direction. As described above, the correction unit 64 increases or decreases the phase $\theta$ so that the magnitude of the electric power approaches the minimum value M1. The correction unit 64 feedback-controls the phase $\theta$ on the basis of a variation of the electric power.

For example, the correction unit 64 corrects the phase $\theta$ for every predetermined period. Specifically, an electric power value that is used in the correction of the phase $\theta$ is an average value in the predetermined period. The correction unit 64 calculates an average value of the electric power for every predetermined period. The correction unit 64 corrects the phase $\theta$ on the basis of an average value of electric power in a first period and an average value of electric power in a second period after the first period. The first period and the second period may be continuous with each other, or may be separated from each other.

The correction unit 64 corrects the phase $\theta$ in a predetermined range. Specifically, in a case where the phase $\theta$ after correction is within a predetermined range, the correction unit 64 outputs a signal relating to the phase $\theta$ after correction to the output unit 63. In a case where the phase $\theta$ after correction is larger than a maximum limit value, the correction unit 64 recognizes the maximum limit value as the phase $\theta$ after correction, and outputs a signal relating to the maximum limit value to the output unit 63. In a case where the phase $\theta$ after correction is smaller than a minimum limit value, the correction unit 64 recognizes the minimum limit value as the phase $\theta$ after correction, and outputs a signal relating to the minimum limit value to the output unit 63.

The correction unit 64 includes an execution mode in which correction of the phase θ is executed, and a pause mode in which correction of the phase θ is paused. The correction unit 64 switches the execution mode and the pause mode on the basis of an operation situation and the like of the electric machine 2.

Figure 4:
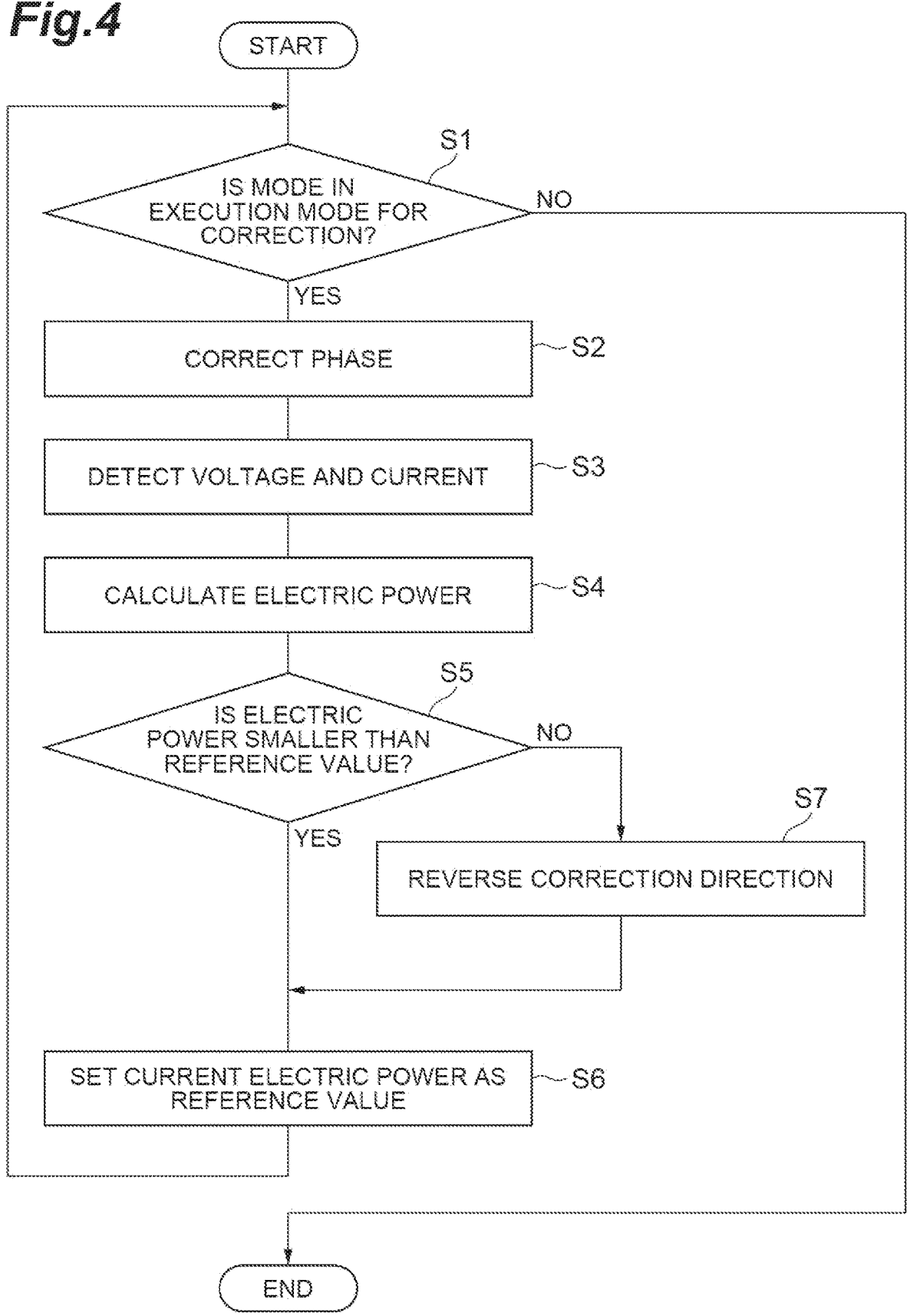
FIG. 4 is a flowchart illustrating processing executed in a control unit illustrated in FIG. 1.

Next, process executed in the control device 6A will be described. As illustrated in FIG. 4, the correction unit 64 determines whether or not a mode is in the execution mode (step S1). In a case of YES in step S1, the correction unit 64 corrects the phase θ (step S2).

Specifically, the correction unit 64 adds a correction width to a current phase θ and calculates the phase θ after correction. The correction unit 64 determines whether or not the phase θ after correction is within a predetermined range. In a case where the phase θ after correction is within the predetermined range, the correction unit 64 outputs a signal relating to the phase θ after correction to the output unit 63. In a case where the phase θ after correction is larger than a maximum limit value, the correction unit 64 outputs a signal relating to the maximum limit value to the output unit 63. In a case where the phase θ after correction is smaller than a minimum limit value, the correction unit 64 outputs a signal relating to the minimum limit value to the output unit 63.

Next, the voltage detection unit 61 and the current detection unit 62 respectively detect a voltage and a current which are output from the power supply 3 (step S3). Next, the correction unit 64 calculates electric power input to the electric machine 2 on the basis of signals which are transmitted from the voltage detection unit 61 and the current detection unit 62 (step S4).

Next, the correction unit 64 determines whether or not the electric power is smaller than a reference value (step S5). The reference value is an electric power value calculated in the previous processing. In a case of YES in step S5, the correction unit 64 sets the current electric power calculated in step S4 as a new reference value. Next, step S1 is executed again.

In a case of NO in step S1, the processing is terminated. In a case of NO in step S5, the correction unit 64 reverses the correction direction to the second direction (step S7). After step S7 is executed, step S6 is executed. Correction of the phase θ is repeated so that the magnitude of the electric power input to the electric machine 2 approaches the minimum value M1 by repeating the above-described processing. That is, correction of the phase θ is repeated so that a loss in the electric power converter 5 approaches a minimum value, or the electric power input to the electric power converter 5 approaches a minimum value.

Note that, an initial value of the phase θ, an initial value of the correction direction, and an initial value of the electric power are stored in the control unit 60 in advance. In a case where the above-described processing is executed for the first time, in step S2, a correction width is added to the initial value of the phase θ, and the initial value of the correction direction is used as a correction direction. In addition, in step S5, the initial value of the electric power is used as the reference value.

As described above, in the electric machine system 1A, the correction unit 64 corrects the phase θ of the control signal so that the magnitude of the electric power input to the coils of the electric machine 2 approaches the minimum value M1. In a case where the magnitude of the electric power becomes the minimum value M1, it is assumed that the loss of the electric machine 2 is minimum, that is, the phase θ is optimal. According to this, the phase θ is optimized, and thus wasteful power consumption may be suppressed. Accordingly, according to the electric machine system 1A, the performance may be improved.

In the related art, when operating an electric machine, it is expected that a rotating magnetic field is generated by detecting a magnetic pole position of a rotator and causing a current to flow to coils of a stator at optimal timing at which rotational torque is generated. However, an optimal value or a target value of a drive current phase may deviate from a true magnetic pole position of the rotator due to a detection error of the magnetic pole position of the rotator, or an error of current flowing timing. This tends to worsen as a rotation region of the rotator increases. In addition, it becomes the cause for deterioration in performance such as a decrease in an output of the electric machine, a decrease in a power factor, and an increase in loss due to an increase in a drive current. In addition, it has caused unintentional strengthening (field strengthening) or weakening (field weakening) of a magnetic field of the stator and a magnetic field of the rotator, and insufficient voltage or magnet demagnetization.

In the electric machine system 1A, current flowing timing (phase θ) determined from a detected value of the magnetic pole position of the rotator is corrected, and conditions where electric power is minimized are maintained while constantly changing the phase. According to this, a drive current phase with respect to a true magnetic pole position of the rotator may be suppressed from deviating from an optimal value or a target value due to an error of a detected value of the magnetic pole position of the rotator, or an error of current flowing timing (phase θ). In addition, a phase deviation may be maintained to be minimum regardless of operation conditions. According to this, the risk of deterioration of output characteristics of the electric machine 2, insufficient voltage or magnet demagnetization may be suppressed. According to the electric machine system 1A, tracking control may be performed so that an error of a drive current phase with respect to a true magnetic pole position of the rotator is minimized by searching an optimal value of the drive current phase with respect to the true magnetic pole position of the rotator.

The electric machine 2 is an electric motor. The extreme value is a minimum value. In a case where the electric power decreases as a result of correction of the phase θ in the first direction, the correction unit 64 corrects the phase θ in the first direction again, and in a case where the electric power increases as a result of correction of the phase θ in the first direction, the correction unit 64 corrects the phase θ in a second direction opposite to the first direction. According to this configuration, in a case where the electric machine 2 is an electric motor, the correction direction of the phase θ may be changed on the basis of a variation of the electric power due to correction of the phase θ. According to this, the magnitude of the electric power may be minimized.

In a case where the phase θ becomes larger than a maximum limit value as a result of correction of the phase θ, the correction unit 64 sets the maximum limit value as the phase θ after correction, and in a case where the phase θ becomes smaller than a minimum limit value as a result of correction of the phase θ, the correction unit 64 sets the minimum limit value as the phase θ after correction. According to this configuration, the phase θ may be suppressed from deviating to an unintended range.

The correction unit 64 includes an execution mode in which correction of the phase θ is executed, and a pause mode in which correction of the phase θ is paused. According to this configuration, a mode may be switched to the execution mode in a case where it is necessary to correct the phase θ of the signal with respect to the position of the rotator such as a case where vibration or output abnormality is detected.

The voltage detection unit 61 detects a DC voltage V output from the power supply 3. The current detection unit 62 detects a DC current I output from the power supply 3. According to this, more stable detected values of the voltage and the current, for example, in comparison to a case of detecting an AC voltage and AC current supplied from the drive device 4A to the electric machine 2 may be obtained. Accordingly, the correction unit 64 may determine a variation of the electric power with higher precision.

Figure 5:
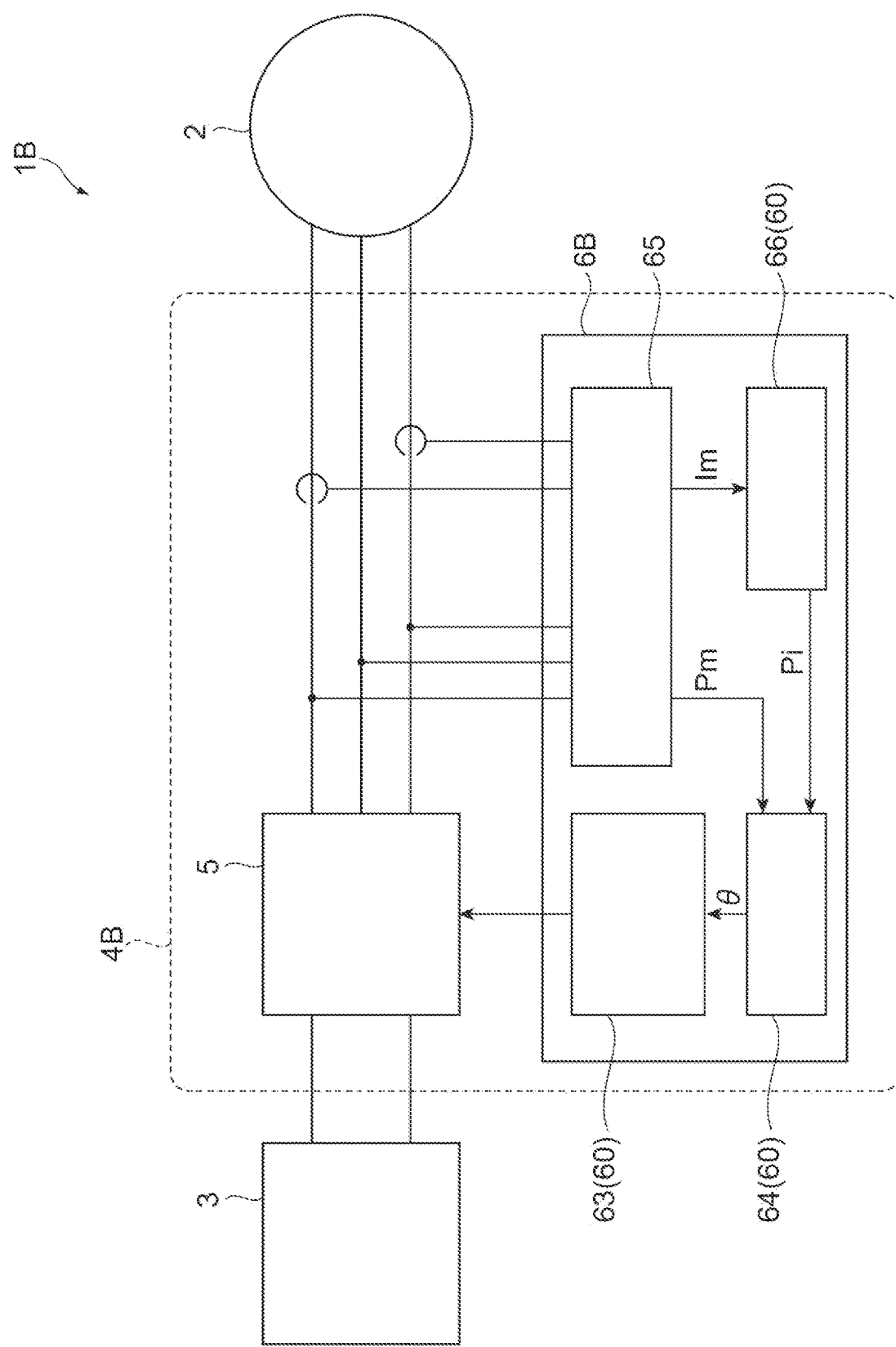
FIG. 5 is a configuration diagram of an electric machine system according to an example.

As illustrated in FIG. 5, an electric machine system 1B is mainly different from the electric machine system 1A of FIG. 1 in that a drive device 4B is provided instead of the drive device 4A. The drive device 4B is mainly different from the drive device 4A in that a control device 6B is provided instead of the control device 6A. The other configurations of the electric machine system 1B are the same likewise the electric machine system 1A. Hereinafter, differences of the electric machine system 1B that are different from the electric machine system 1A will be described.

The control device 6B includes an electric power detection unit 65 and a control unit 60. The electric power detection unit 65 is connected between the electric power converter 5 and the electric machine 2. The electric power detection unit 65 detects an AC voltage and an AC current output from the electric power converter 5, and calculates electric power Pin output from the electric power converter 5. The electric power detection unit 65 transmits a signal relating to the calculated electric power Pin to the correction unit 64.

The control unit 60 further includes an operation unit 66 as a functional configuration. The electric power detection unit 65 transmits a signal relating to a detected current Im to the operation unit 66. The operation unit 66 calculates electric power Pi consumed by the electric power converter 5 on the basis of the signals transmitted from the electric power detection unit 65. The operation unit 66 outputs the signal relating to the calculated electric power Pi to the correction unit 64. The correction unit 64 calculates electric power input to the drive device 4B by adding the electric power Pin and the electric power Pi. The correction unit 64 corrects the phase θ on the basis of the electric power input to the drive device 4B.

According to the electric machine system 1B, the performance may be improved by optimizing the phase θ likewise the electric machine system 1A.

Figure 6:
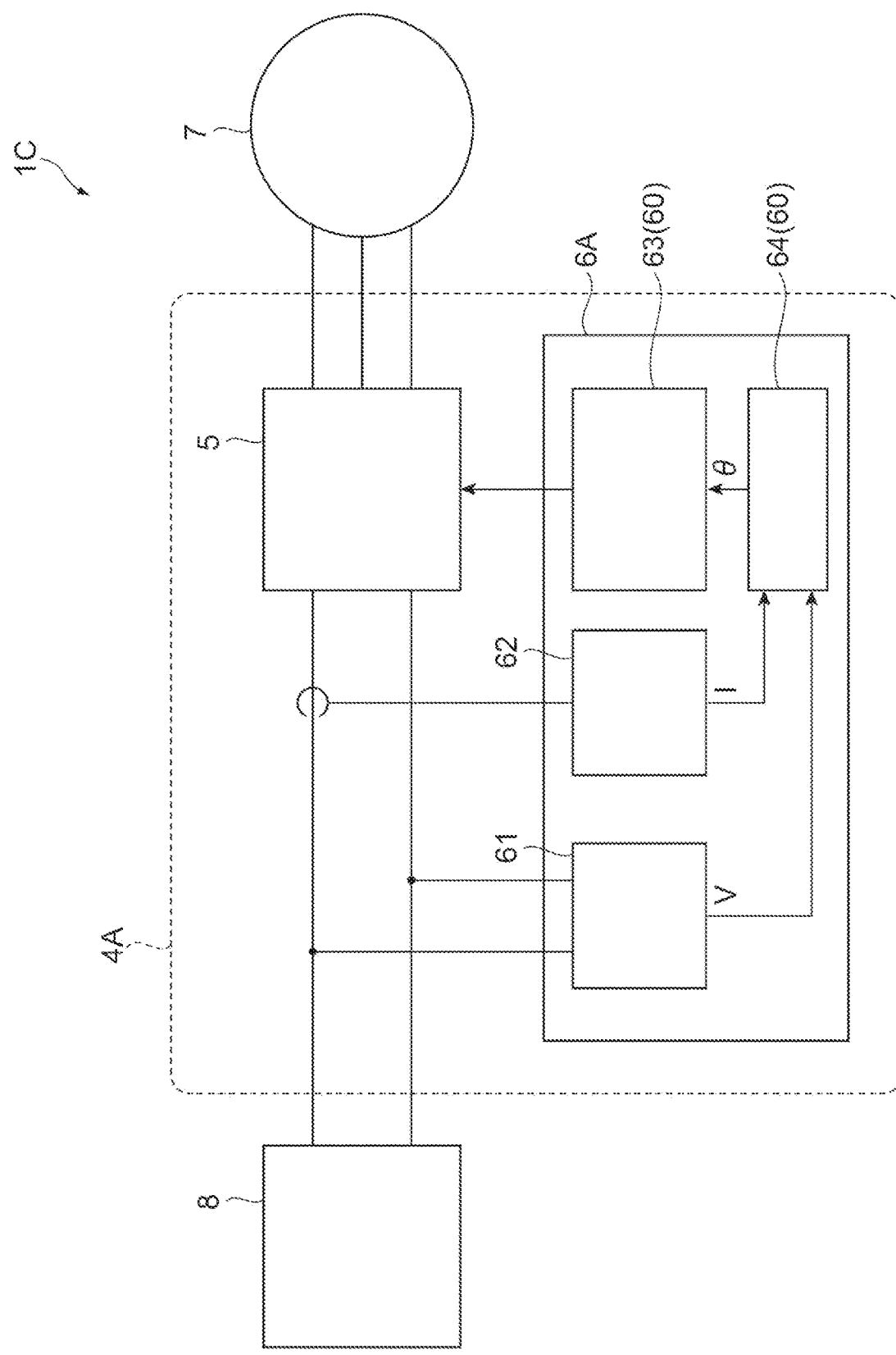
FIG. 6 is a configuration diagram of an electric machine system according to an example.

As illustrated in FIG. 6, an electric machine system 1C according to an example is mainly different from the electric machine system 1A in that an electric machine 7 is provided instead of the electric machine 2, and a load 8 is provided instead of the power supply 3. The other configurations of the electric machine system 1C are the same as the electric machine system 1A. Hereinafter, differences of the electric machine system 1C that are different from the electric machine system 1A will be described.

The electric machine 7 is a generator. The electric machine 7 includes a stator and a rotator likewise the electric machine 2. For example, the rotator rotates by driving of an engine or the like. A current flows through coils of the stator due to an operation of a magnetic field of the rotator. The electric machine 7 outputs AC electric power. For example, the load 8 is a storage battery.

The electric power converter 5 inputs electric power output from the electric machine 7 to the load 8. That is, the electric power output from the electric machine 7 is input to the load 8 through the electric power converter 5. The electric power converter 5 functions as a converter. The electric power converter 5 converts AC electric power output from the electric machine 7 to DC electric power. The electric power converter 5 inputs the DC electric power to the load 8. Hereinafter, the electric power input to the load 8 is simply referred to as "electric power".

Figure 7:
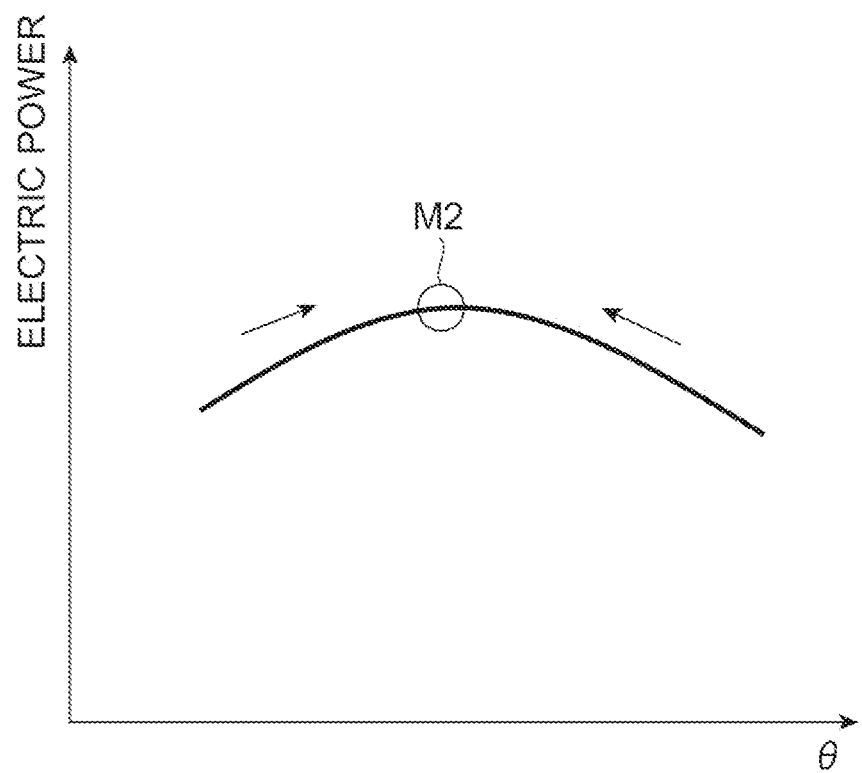
FIG. 7 is a graph showing a relationship between a phase of a signal with respect to a position of a rotator, and electric power of the electric machine.

The correction unit 64 corrects the phase θ so that the magnitude of the electric power becomes an extreme value. In this example, the extreme value is a maximum value. As illustrated in FIG. 7, the magnitude of the electric power tends to increase in accordance with an increase in the phase θ, and tends to decrease after reaching a maximum value M2. When the phase θ with respect to the position of the rotator approaches an optimal value, a power factor is improved, and a loss of a system is reduced, and as a result, the magnitude of the electric power approaches the maximum value M2. In other words, in a case where the magnitude of the electric power becomes the maximum value M2, it is assumed that the phase θ becomes an optimal value.

The correction unit 64 maintains the correction direction in a case where the electric power increases, and reverses the correction direction in a case where the electric power decreases. Specifically, in a case where the electric power increases as a result of correction of the phase θ in an increasing direction (first direction), the correction unit 64 corrects the phase θ in the increasing direction again. In a case where the electric power decreases as a result of correction of the phase θ in the increasing direction, the correction unit 64 corrects the phase θ in a decreasing direction (second direction opposite to the first direction).

In a case where the electric power increases as a result of correction of the phase θ in the decreasing direction, the correction unit 64 corrects the phase θ in the decreasing direction again. In a case where the electric power decreases as a result of correction of the phase θ in the decreasing direction, the correction unit 64 corrects the phase θ in the increasing direction. In this manner, the correction unit 64 increases or decreases the phase θ so that the magnitude of the electric power approaches the maximum value M2. The correction unit 64 feedback-controls the phase θ on the basis of a variation of the electric power.

Figure 8:
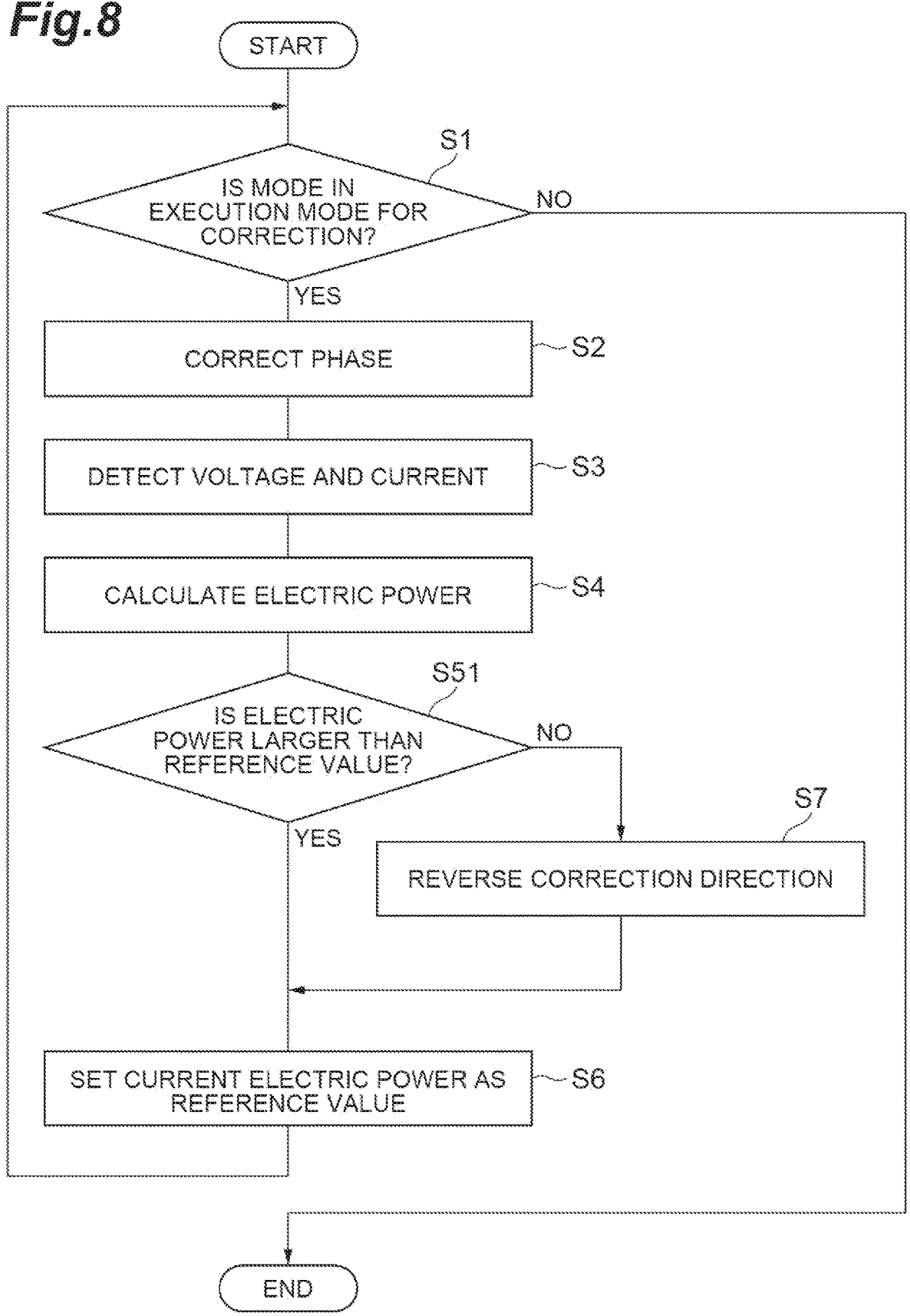
FIG. 8 is a flowchart illustrating processing executed in a control unit illustrated in FIG. 6.

Next, description will be given of processing executed in the control device 6A. As illustrated in FIG. 8, processing executed by the control device 6C of the electric machine system 1C is different in that step S51 is included instead of step S5. The other configurations of the processing of the electric machine system 1C are the same as the processing of the electric machine system 1A. In step S51, the correction unit 64 determines whether or not the electric power is larger than a reference value.

According to the electric machine system 1C, the performance may be improved by optimizing the phase θ likewise the electric machine system 1A.

MODIFICATION EXAMPLE

Hereinbefore, description has been given of the examples, but the present disclosure is not limited to the above-described examples.

Figure 9:
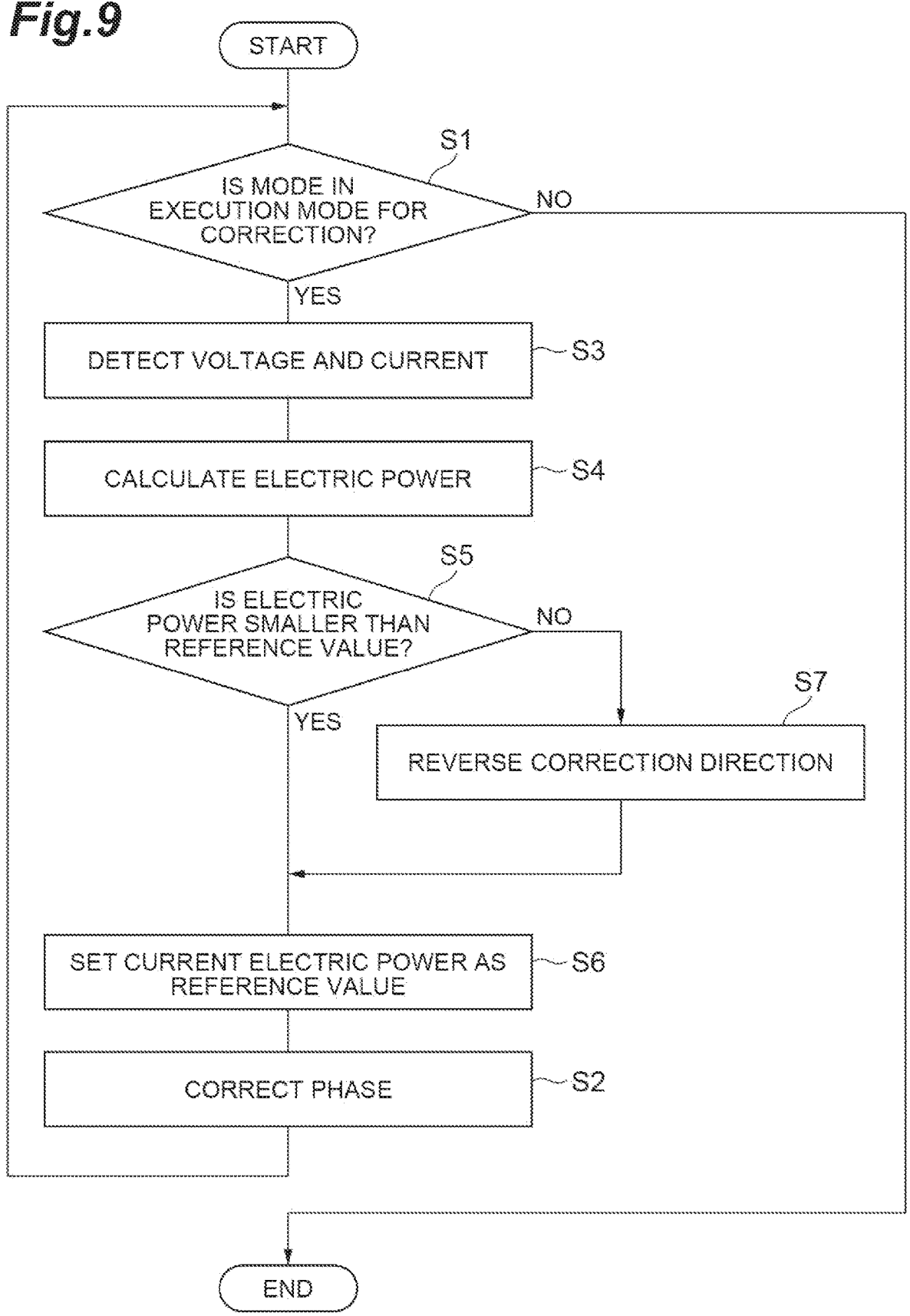
FIG. 9 is a flowchart illustrating a modification example of the processing executed in the control unit illustrated in FIG. 1.

In the example above, description has been given of an example in which step S2 is executed after step S1, but as illustrated in FIG. 9, step S2 may be executed after step S6. Specifically, in a case of YES in step S1, step S3 is executed. After step S6 is executed, step S2 is executed. After step S2 is executed, step S1 is executed again.

In the example above, description has been given of an example in which the position of the rotator is detected by the resolver, but the position of the rotator may be detected, for example, by a hall sensor. The position of the rotator may be estimated. Various known methods may be used for detection and estimation of the position of the rotator.

In the example above, description has been given of an example in which the power supply 3 is a DC power supply, but the power supply 3 may be an AC power supply. In this case, AC electric power output from the power supply 3 is rectified to DC electric power, and the DC electric power is input to the drive device 4A.

In the example above, description has been given of an example in which the electric power Pi is calculated on the basis of the current Im, but the electric power Pi may be calculated on the basis of table data or the like. In addition, Pin may be calculated as an effective value from a detected value. In a case where vector control is applied, Pin may be calculated on dq coordinates. Various known methods may be used for calculation of Pin.

In the example above, description has been given of an example in which the control unit 60 includes the operation unit 66, but the control unit 60 may not include the operation unit 66. In this case, the correction unit 64 corrects the phase θ on the basis of a signal relating to Pin transmitted from the electric power detection unit 65. That is, the correction unit 64 may correct the phase θ on the basis of electric power output from the drive device 4B.

In the respective examples, description has been given of an example in which the correction unit 64 calculates electric power on the basis of a voltage and a current, and corrects the phase θ so that the magnitude of the electric power approaches an extreme value, but the correction unit 64 may correct the phase θ so that the magnitude of the current approaches an extreme value. In the electric machine systems 1A and 1B, a phase θ in which the electric power becomes the minimum value M1 (refer to FIG. 3) and a phase θ in which the current becomes a minimum value match each other. In the electric machine system 1C, a phase θ in which the electric power becomes the maximum value M2 (refer to FIG. 7) and a phase θ in which the current becomes a maximum value match each other. Accordingly, when the magnitude of the current approaches the extreme value, the magnitude of the electric power also approaches the extreme value. For example, the current may be calculated as an effective value from a detected value (instantaneous value). The current may be calculated on dg coordinates in a case where vector control is applied.

Figure 10:
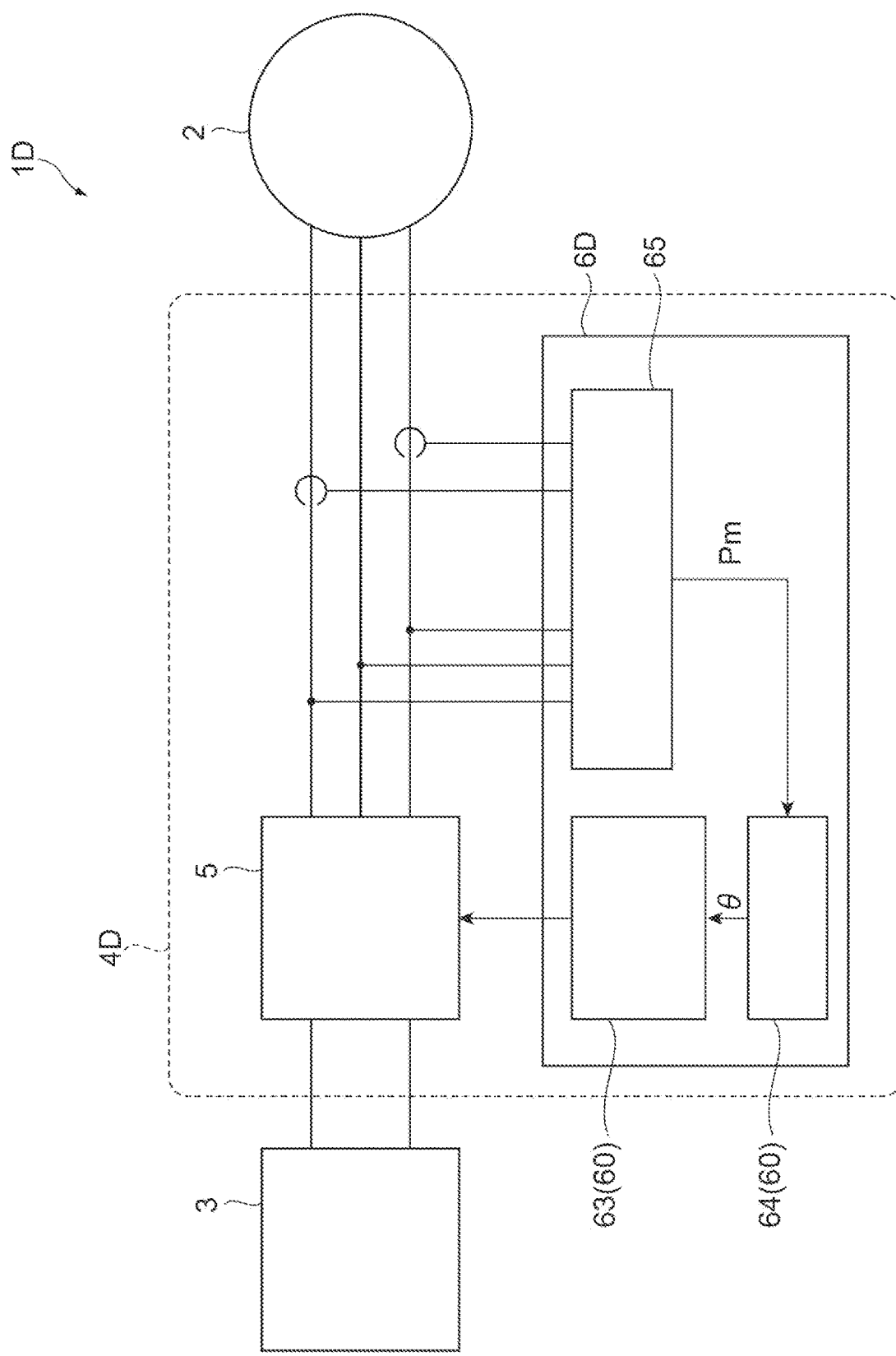
FIG. 10 is a configuration diagram of an electric machine system according to an example.

Description will be given of a control example based on a signal from the electric power detection unit 65 provided in an electric machine system 1D. As illustrated in FIG. 10, the electric machine system 1D according to an example is mainly different from the electric machine system 1B of FIG. 5 in that a drive device 4D is provided instead of the drive device 4B. The drive device 4D is mainly different from the drive device 4B in that a control device 6D is provided instead of the control device 6B. The other configurations of the electric machine system 1D are the same as the electric machine system 1B. Hereinafter, differences of the electric machine system 1D that are different from the electric machine system 1B will be described.

In this example, the control unit 60 of the control device 6D corrects the phase θ on the basis of a signal relating to electric power Pm which is transmitted from the electric power detection unit 65. The correction unit 64 of the control unit 60 corrects the phase θ so that the electric power Pin output from the drive device 4D approaches an extreme value. In correction of the phase θ, the correction unit 64 may not consider electric power consumed by the electric power converter 5. According to the electric machine system 1D, the performance may be improved by optimizing the phase θ likewise the electric machine system 1B.

Figure 11:
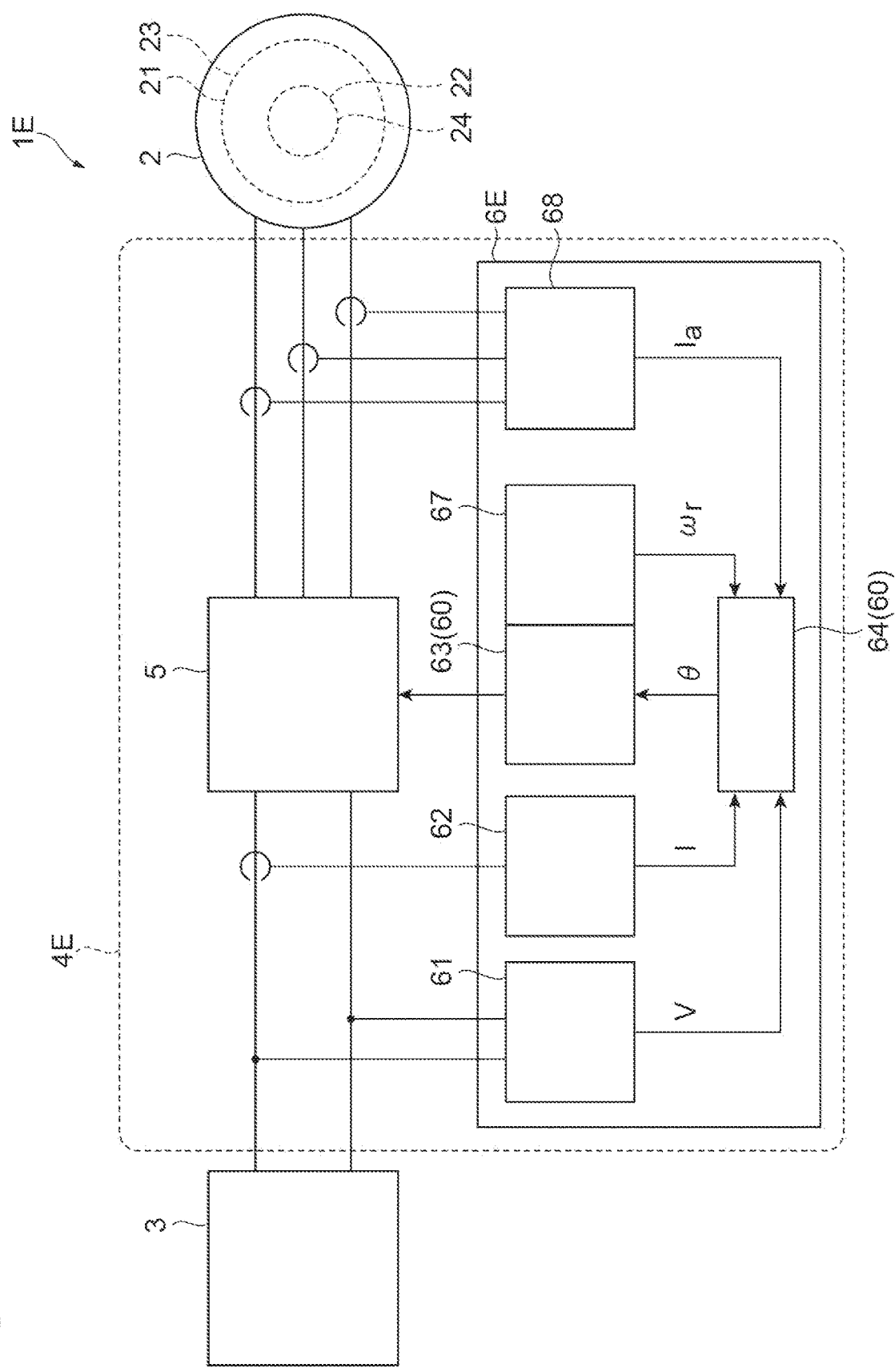
FIG. 11 is a configuration diagram of an electric machine system according to an example.

As illustrated in FIG. 11, an electric machine system 1E according to an example is mainly different from the electric machine system 1A of FIG. 1 in that a drive device 4E is provided instead of the drive device 4A. The drive device 4E is mainly different from the drive device 4A in that a control device 6E is provided instead of the control device 6A. The other configurations of the electric machine system 1E are the same as the electric machine system 1A. Hereinafter, differences of the electric machine system 1E that are different from the electric machine system 1A will be described.

An electric machine 2 of the electric machine system 1E includes a stator 21, and a rotator 22 that is rotatable with respect to the stator 21 likewise the electric machine 2 of the electric machine system 1A. The stator 21 includes coils 23. The rotator 22 includes a magnet 24.

The control device 6E further includes a speed estimation unit 67 and a current detection unit 68. The speed estimation unit 67 estimates a rotational speed (or of the electric machine 2. The rotational speed (or is detected, for example, by a magnetic pole position sensor (for example, a resolver), a revolution sensor, or the like. The rotational speed (or may be an estimated value that is applied, for example, to magnetic pole position sensorless control or the like. The speed estimation unit 67 transmits a signal relating to the rotational speed or to the correction unit 64.

The current detection unit 68 is connected between the electric power converter 5 and the electric machine 2. The current detection unit 68 detects an AC current Ia output from the electric power converter 5. For example, the AC current Ia may be calculated as an effective value or an absolute average value from a detected value (instantaneous value). The current may be calculated on dq coordinates in a case where vector control is applied. The current detection unit 68 transmits a signal relating to the AC current Ia to the correction unit 64.

The correction unit 64 calculates an index value on the basis of a signal relating to the voltage V which is transmitted from the voltage detection unit 61, a signal relating to the current I which is transmitted from the current detection unit 62, a signal relating to the rotational speed (or which is transmitted from the speed estimation unit 67, and a signal relating to the current Ia which is transmitted from the current detection unit 68.

The index value correlates with a current that is input with respect to the coils of the electric machine 2. As the magnitude of the current that is input with respect to the coils of the electric machine 2 is larger, the index value is larger. In this example, the index value is a division value obtained by dividing the current Ia (current input with respect to the coils of the electric machine 2) by torque of the electric machine 2. When the torque of the electric machine 2 is set as T, the voltage (DC voltage output from the power supply 3) input to the electric power converter 5 is set as V, the current (DC current output from the power supply 3) input to the electric power converter 5 is set as I, an AC current that is input with respect to the electric machine 2 is set as Ia, and the rotational speed of the electric machine 2 is set as ωr, the torque of the electric machine 2 is calculated by Expression of T=(V×I−K×Ia)/ωr. Here, K represents a loss coefficient calculated on the basis of specifications of the electric power converter 5 and the electric machine 2.

The correction unit 64 corrects the phase θ so that the index value approaches an extreme value. The index value in this example is a minimum value.

As described above, in the electric machine system 1E, the correction unit 64 corrects the phase θ of the signal so that the index value correlated with the current input with respect to the coils approaches the extreme value. In a case where the index value correlated with the current input with respect to the coils becomes the extreme value, it is assumed that the loss of the electric machine 2 is minimum, that is, the phase θ of the signal with respect to the position of the rotator is optimal. According to this, even when the position of the rotator is not detected with high precision, wasteful power consumption may be suppressed by optimizing the phase θ of the signal. Accordingly, according to the electric machine system 1E, the performance may be improved.

Figure 12:
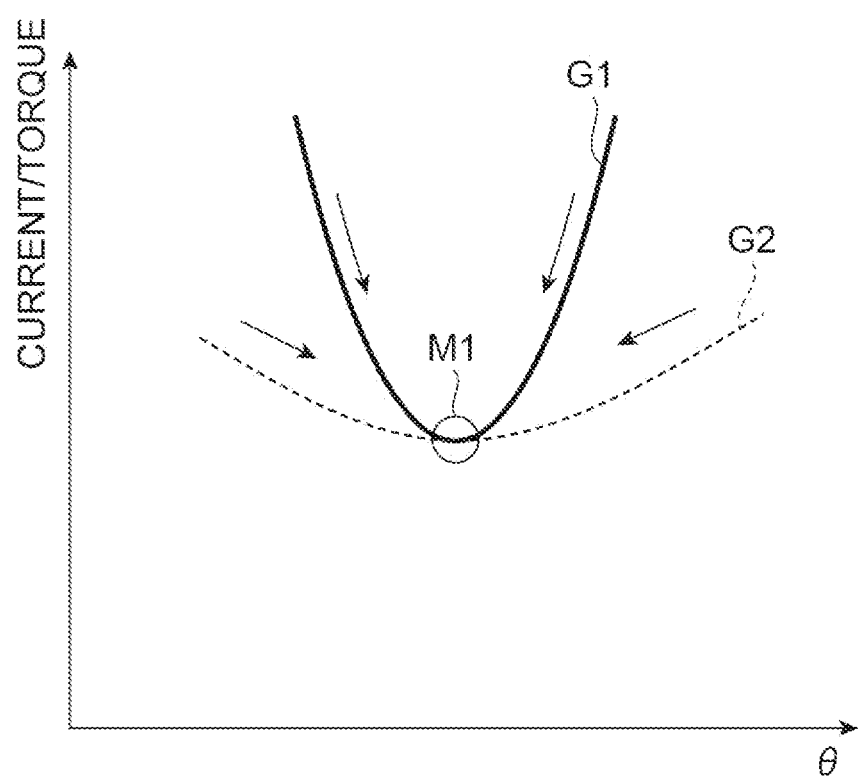
FIG. 12 is a graph showing a relationship between a phase of a signal with respect to a position of a rotator, and an index value.

The index value is a division value obtained by dividing the current Ia input with respect to the coils by torque of the electric machine 2. According to this, since a variation amount of the index value per a variation amount of the phase θ becomes relatively large, the control of the phase θ may be performed with higher sensitivity. Specifically, as illustrated in FIG. 12, the variation amount of the index value per the variation amount of the phase θ (refer to a solid-line G1 in FIG. 12) is larger in comparison to a variation amount of electric power per the variation amount of the phase θ (refer to a dotted-line G2 in FIG. 12). According to this, since the minimum value (extreme value) M1 is more prominent, the phase θ may be corrected with higher sensitivity so that the index value approaches the minimum value M1. In addition, since the torque of the electric machine 2 is calculated by the above-described Expression, a device configuration becomes simpler in comparison to a case where the torque is detected, for example, by a sensor or the like. Accordingly, the cost may be reduced.

The index value may be a current that is input with respect to the coils of the electric machine 2. The index value may be a multiplication value obtained by multiplying an AC current that is input with respect to the coils of the electric machine 2 by an AC voltage that is input with respect to the coils of the electric machine 2. The index value may be a temperature of the coils of the electric machine 2. A temperature of the coils of the electric machine 2 is a value measured, for example, by a thermometer. The temperature of the coils of the electric machine 2 correlates with a current that is input with respect to the coils of the electric machine 2. As the magnitude of the current that is input with respect to the coils is larger, the temperature of the coils is higher. The index value may be a division value obtained by dividing the temperature of the coils of the electric machine 2 by the torque of the electric machine 2. The index value may be electric power that is input with respect to the coils of the electric machine 2. The index value may correlate with the current that is input with respect to the coils of the electric machine 2. In the cases, the performance of the electric machine system may be improved by using various values as the index value.

The torque of the electric machine 2 may be calculated on the basis of an output of the electric machine 2. The torque of the electric machine 2 may be detected by a sensor.

The electric machine systems 1D and 1E may be provided with the electric machine 7 of FIG. 6 instead of the electric machine 2. The electric machine systems 1D and 1E may be provided with the load 8 of FIG. 6 instead of the power supply 3. In this case, the electric power converter 5 inputs electric power output from the electric machine 7 to the load 8. In this case, the index value correlates with a current that is output from the electric machine 7. The extreme value is a maximum value. The correction unit 64 corrects the phase θ so that the index values approach the maximum value.

The electric machine system of the present disclosure is [1] "An electric machine system including: an electric machine including a stator that includes coils, and a rotator that includes a magnet and is rotatable with respect to the stator; an electric power converter that inputs and outputs electric power with respect to the coils; and a control unit that controls the electric power converter, wherein the control unit includes an output unit that outputs a signal for operating the electric power converter to the electric power converter, and a correction unit that corrects a phase of the signal that determines input and output timing of the electric power with respect to the coils, and the correction unit corrects the phase so that the magnitude of the electric power approaches an extreme value".

The electric machine system of the present disclosure may be [2] "The electric machine system according to [1], wherein the electric machine is an electric motor, the extreme value is a minimum value, and in a case where the electric power decreases as a result of correction of the phase in a first direction, the correction unit corrects the phase in the first direction again, and in a case where the electric power increases as a result of correction of the phase in the first direction, the correction unit corrects the phase in a second direction opposite to the first direction".

The electric machine system of the present disclosure may be [3] "The electric machine system according to [1] or [2], wherein in a case where the phase becomes larger than a maximum limit value as a result of correction of the phase, the correction unit sets the maximum limit value as the phase after correction, and in a case where the phase becomes smaller than a minimum limit value as a result of correction of the phase, the correction unit sets the minimum limit value as the phase after correction".

The electric machine system of the present disclosure may be [4] "The electric machine system according to any one of [1] to [3], wherein the correction unit includes an execution mode in which correction of the phase is executed, and a pause mode in which correction of the phase is paused".

The electric machine system of the present disclosure may be [5] "The electric machine system according to [1], wherein the electric machine is a generator, the extreme value is a maximum value, and in a case where the electric power increases as a result of correction of the phase in the first direction, the correction unit corrects the phase in the first direction again, and in a case where the electric power decreases as a result of correction of the phase in the first direction, the correction unit corrects the phase in a second direction opposite to the first direction".

The electric machine system of the present disclosure is [6] "An electric machine system including an electric machine including a stator that includes coils, and a rotator that includes a magnet and is rotatable with respect to the stator; an electric power converter that inputs and outputs electric power with respect to the coils; and a control unit that controls the electric power converter, wherein the control unit includes an output unit that outputs a signal for operating the electric power converter to the electric power converter, and a correction unit that corrects a phase of the signal that determines input and output timing of the electric power with respect to the coils, and the correction unit corrects the phase so that an index value correlated to a current that is input and output with respect to the coils approaches an extreme value".

The electric machine system of the present disclosure may be [7] "The electric machine system according to [6], wherein the index value is a division value obtained by dividing the current by torque of the electric machine".

The electric machine system of the present disclosure may be [8] "The electric machine system according to [6], wherein the index value is the current".

The electric machine system of the present disclosure may be [9] "The electric machine system according to [6], wherein the index value is a multiplication value obtained by multiplying an AC current that is input and output with respect to the coils by an AC voltage that is input and output with respect to the coils".

The invention claimed is:

1. An electric machine system, comprising:
    an electric machine comprising a stator that comprises coils, and a rotator that comprises a magnet and is rotatable with respect to the stator;
    an electric power converter that inputs and outputs electric power with respect to the coils of the electric machine; and
    at least one processor configured to:
        correct a phase of a signal so that a magnitude of a correction reference approaches an extreme value, wherein the signal is for operating the electric power converter and the phase of the signal determines an input timing or an output timing of the electric power with respect to the coils of the electric machine, and
        output the signal to the electric power converter.

2. The electric machine system according to claim 1, further comprising a power supply,
    wherein the electric machine is an electric motor,
    wherein the correction reference corresponds to input electric power input from the power supply to the electric power converter, and
    wherein the extreme value is a minimum value.

3. The electric machine system according to claim 2,
    wherein in a case where the input electric power decreases as a result of a correction of the phase in a first direction, the processor is further configured to correct the phase in the first direction again, and
    wherein in a case where the input electric power increases as the result of the correction of the phase in the first direction, the processor is further configured to correct the phase in a second direction opposite to the first direction.

4. The electric machine system according to claim 3,
    wherein the phase increases in the first direction, and
    wherein the processor is further configured to increase the phase in the first direction by a predetermined correction width with respect to a reference phase.

5. The electric machine system according to claim 3,
    wherein the phase decreases in the second direction, and
    wherein the processor is further configured to decrease the phase in the second direction by a predetermined correction width with respect to a reference phase.

6. The electric machine system according to claim 3,
    wherein in a case where the phase becomes larger than a maximum limit value as the result of the correction of the phase, the processor is further configured to set the maximum limit value as a phase after the correction, and
    wherein in a case where the phase becomes smaller than a minimum limit value as the result of the correction of the phase, the processor is further configured to set the minimum limit value as the phase after the correction.

7. The electric machine system according to claim 2,
    wherein the correction reference corresponds to an average value of the input electric power during a predetermined period.

8. The electric machine system according to claim 7,
    wherein the predetermined period is continuous with a previous period in a timeline.

9. The electric machine system according to claim 7,
    wherein the predetermined period is separated from a previous period in a timeline.

10. The electric machine system according to claim 2,
    wherein the processor has an execution mode in which a correction of the phase is executed, and a pause mode in which the correction of the phase is paused.

11. The electric machine system according to claim 1, further comprising a power supply,
    wherein the electric machine is an electric motor,
    wherein the correction reference corresponds to output electric power output from the electric power converter to the electric motor,
    wherein the extreme value is a minimum value.

12. The electric machine system according to claim 1, further comprising a power supply,
    wherein the electric machine is an electric motor,
    wherein the correction reference corresponds to output electric power output from the electric power converter to the electric motor and consumed electric power consumed by the electric power converter,
    wherein the extreme value is a minimum value.

13. The electric machine system according to claim 1, further comprising a load,
    wherein the electric machine is a generator,
    wherein the correction reference corresponds to output electric power output from the electric power converter to the load,
    wherein the extreme value is a maximum value.

14. The electric machine system according to claim 13,
    wherein in a case where the output electric power increases as a result of a correction of the phase in a first direction, the processor is further configured to correct the phase in the first direction again, and
    wherein in a case where the output electric power decreases as the result of the correction of the phase in the first direction, the processor is further configured to correct the phase in a second direction opposite to the first direction.

15. The electric machine system according to claim 1, further comprising a power supply,
    wherein the electric machine is an electric motor,
    wherein the correction reference corresponds to an index value correlated to a current that is input to the coils of the electric motor,
    wherein the extreme value is a minimum value.

16. The electric machine system according to claim 15,
    wherein the index value corresponds to a value obtained by dividing the current by torque of the electric motor.

17. The electric machine system according to claim 15,
    wherein the index value corresponds to the current.

18. The electric machine system according to claim 15,
    wherein the index value corresponds to a value obtained by multiplying an AC current that is input and output with respect to the coils of the electric motor by an AC voltage that is input and output with respect to the coils of the electric motor.

19. At least one processor forming an electric machine system with an electric machine and an electric power converter, the processor configured to:

correct a phase of a signal so that a magnitude of a correction reference approaches an extreme value, wherein the signal is for operating the electric power converter and the phase of the signal determines an input timing or an output timing of electric power with respect to the electric machine, and output the signal to the electric power converter.

20. A method for correcting a phase of a signal in an electric machine system comprising an electric machine and an electric power converter, the method comprising:

correcting the phase of the signal so that a magnitude of a correction reference approaches an extreme value, wherein the signal is for operating the electric power converter and the phase of the signal determines an input timing or an output timing of electric power with respect to the electric machine, and outputting the signal to the electric power converter.

* * * * *